US007996138B2

(12) United States Patent
Rehm et al.

(10) Patent No.: US 7,996,138 B2
(45) Date of Patent: Aug. 9, 2011

(54) CONTROL UNIT FOR OPERATING A VEHICLE DRIVE

(75) Inventors: Lothar Rehm, Herrenberg (DE); Juergen Schenk, Albershausen (DE); Hans-Christoph Wolf, Stuttgart (DE)

(73) Assignee: Daimler AG, Stuttgart (DE)

( * ) Notice: Subject to any disclaimer, the term of this patent is extended or adjusted under 35 U.S.C. 154(b) by 127 days.

(21) Appl. No.: 12/307,546

(22) PCT Filed: Jun. 23, 2007

(86) PCT No.: PCT/EP2007/005560

§ 371 (c)(1),
(2), (4) Date: Jun. 16, 2009

(87) PCT Pub. No.: WO2008/003410

PCT Pub. Date: Jan. 10, 2008

(65) Prior Publication Data

US 2009/0319149 A1 Dec. 24, 2009

(30) Foreign Application Priority Data

Jul. 5, 2006 (DE) ........................ 10 2006 031 007

(51) Int. Cl.
*G06F 7/00* (2006.01)

(52) U.S. Cl. ........................................................ 701/84

(58) Field of Classification Search .................... 701/84, 701/87, 93, 99

See application file for complete search history.

(56) References Cited

U.S. PATENT DOCUMENTS

| | | | | |
|---|---|---|---|---|
| 5,880,568 | A | 3/1999 | Bederna et al. | |
| 5,983,859 | A | 11/1999 | Bruedigam et al. | |
| 6,236,925 | B1 | 5/2001 | Gierling et al. | |
| 6,401,016 | B1 * | 6/2002 | Yoshino et al. | 701/22 |
| 6,440,038 | B1 | 8/2002 | Holloway | |
| 6,497,301 | B2 * | 12/2002 | Iida et al. | 180/249 |
| 6,915,202 | B2 | 7/2005 | Folke | |
| 7,722,497 | B2 * | 5/2010 | Tabata et al. | 477/3 |

FOREIGN PATENT DOCUMENTS

| | | | |
|---|---|---|---|
| DE | 44 38 714 | A1 | 5/1996 |
| DE | 197 03 685 | A1 | 8/1998 |
| DE | 198 45 167 | A1 | 4/2000 |
| DE | 102 21 341 | A1 | 11/2003 |
| DE | 10 2004 036 515 | A1 | 3/2006 |
| EP | 0 349 993 | A2 | 1/1990 |
| EP | 1 548 253 | A1 | 6/2005 |
| JP | 1-244140 | A | 9/1989 |
| WO | WO 2006/062018 | A1 | 6/2006 |

OTHER PUBLICATIONS

International Search Report including English translation of the relevant portion (Five (5) pages).
International Preliminary Examination Report including English translation of the relevant portion (Ten (10) pages).

* cited by examiner

*Primary Examiner* — Kim T Nguyen
(74) *Attorney, Agent, or Firm* — Crowell & Moring LLP

(57) ABSTRACT

In a control unit for operating a vehicle drive, and to a method for operating the control unit. An upper bound is imposed on the final desired torque output by the control unit with a limiting torque dependent on the measured/manipulated variables of the accelerator pedal value sensor, when the detected vehicle speed lies below a starting limiting speed.

10 Claims, 1 Drawing Sheet

CONTROL UNIT FOR OPERATING A VEHICLE DRIVE

This application is a national stage of International Application No. PCT/EP2007/005560, filed Jun. 23, 2007, which claims priority under 35 U.S.C. §119 to German Patent Application No. 10 2006 031 007.1, filed Jul. 6, 2006, the entire disclosure of which is herein expressly incorporated by reference.

BACKGROUND AND SUMMARY OF THE INVENTION

The invention relates to a control wait for operating a vehicle drive and to the application of the control unit for operating an internal combustion engine or an electric machine in a motor vehicle.

As is known from German patent document DE 44 38 714 A1 the monitoring of drive control units is generally executed as a three level monitoring concept. This publication describes a method and apparatus for controlling the drive power of a vehicle using a microcomputer, with the aid of at least two mutually independent levels, a first level carrying out the control functions, and a second level carrying out the monitoring functions. A third level forms a control level that controls the monitoring level and thus the microcomputer.

One object of the present invention to provide a control unit for a vehicle drive, with improved fault detection sensitivity.

This and other objects and advantages are achieved by the control unit according to the invention, which has a first limiting device in which a provisional desired torque can be bounded above with a maximum limiting torque to a final desired torque when a detected vehicle speed is greater than or equal to a starting limiting speed. In the limiting device, this provisional desired torque can be bounded above to a final desired torque with a limiting torque dependent on the measured/manipulated variables of the accelerator pedal value sensor when the detected vehicle speed lies below a starting limiting speed.

The starting limiting speed defines a limit for the vehicle speed. From and above this starting limiting speed, the vehicle is in normal driving operation. In this range, the desired torque is bounded above by a maximum limiting torque, which prevents the drive from attempting to produce an undesirably high torque in the event of a fault.

Speeds below the starting limiting speed are ascribed to the starting range of the vehicle. In this case, the desired torque is bounded above with a limiting torque dependent on the measured/manipulated variables of the accelerator pedal value sensor. This arrangement has the advantage that the limiting torque can be selected to be lower than the maximum limiting torque. Consequently, the fault detection sensitivity of the apparatuses raised in the starting range.

In one embodiment of the invention, a limiting device is provided by which the limiting torque dependent on the measured/manipulating variables of the accelerator pedal value sensor can be bounded below with a definable minimum limiting torque. In internal combustion engines, it is necessary (for example, because of the need to adhere exhaust gas regulations) to define a lower operating limit that may not be undershot when stationary or during the starting operation. The minimum limiting torque constitutes this lower operating limit and ensures proper operation of the vehicle drive.

Other objects, advantages and novel features of the present invention will become apparent from the following detailed description of the invention when considered in conjunction with the accompanying drawings.

DETAILED DESCRIPTION OF THE DRAWINGS

Figure 1:
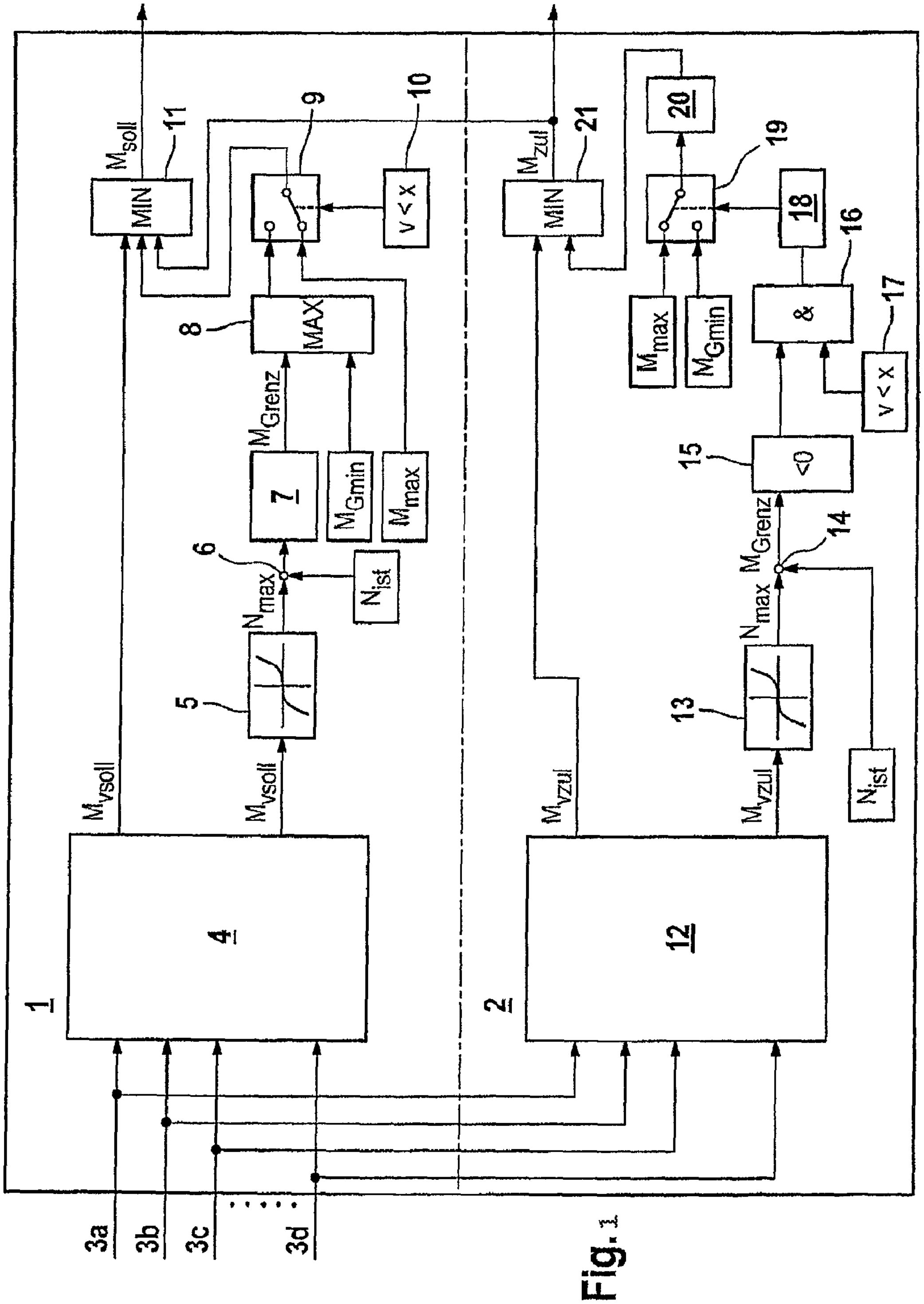
FIG. 1 shows a control unit of a vehicle drive suitable for controlling internal combustion engines or other drives, such as electromechanical drives, hybrid drives or fuel cells.

The control unit has, inter alia, a process level 1 for calculating drive control and diagnostic functions (denoted below as function computer 1), and an associated process monitoring level 2 for monitoring torque-relevant drive control functions of the function computer 1 (denoted below as monitoring computer 2). Via external connections 3*a* to 3*d*, the function computer 1 receives information from measured value sensors or manipulated value sensors relating to the operating state of the motor vehicle and/or the internal combustion engine. To this end, measured values/manipulated variable are passed on to the function computer 1. For example, the function computer 1 receives information from a pedal value sensor of an accelerator pedal via an external connection 3*a*, information relating to the setting of a vehicle speed limiter via a connection 3*b*, and a torque specification Md of an electronic stability program or the like via a connection 3*c*.

A processing device 4 of the function computer 1 processes the input information and calculates a provisional desired torque Mvsoll from the different input measured/manipulated variables and, if appropriate, the additional information assigned to them. It then controls the starting torque, and adapts the driving behavior of the motor vehicle to the pedal value required by the pedal value sensor of the accelerator pedal.

An assigning device 5 of the function computer 1 assigns a maximum speed Nmax to a provisional desired value Mvsoll fed by the processing device 4. The value for Nmax is in turn compared in a device 6 with a current actual speed Nist. In the embodiment illustrated, the value for the current actual speed Nist is subtracted from Nmax. This can be the rotational speed of a vehicle wheel or of a vehicle drive (for example of an internal combustion engine). The device 6 feeds the result of this operation to a device 7, which is typically designed as a speed controller that lowers the actual speed Nist when the latter is greater than Nmax. The device 7 assigns the maximum speed Nmax a torque limiting value MGrenz dependent on the accelerator pedal value, and feeds this torque limiting value MGrenz to a selecting device 8. (In an alternative embodiment, this torque limiting value MGrenz dependent on the accelerator pedal value is already determined from Mvsoll in the processing device 4 or the assigning device 5.)

The selecting device 8 also receives a value for a minimum limiting torque MGmin, which is a result of the requirements of the vehicle drive for proper operation. (These are, for example, the statutory demands placed on the exhaust gas values of an internal combustion engine.) The selecting device 8 is designed, for example, as a comparator, which determines the larger of the values of the two torques MGmin and MGrenz as maximum torque, and feeds this maximum torque to an input of a switching device 9. In this case, the resultant maximum torque usually corresponds to the torque limiting value MGrenz. Only if the torque limiting value MGrenz is smaller than MGmin does the device 8 output MGmin as output value to the switching device 9.

The switching device 9 also receives a maximum limiting torque Mmax, which can be a maximum limiting torque of the drive device (for example an internal combustion engine), or a maximum limiting torque of a vehicle wheel.

The switching device 9 is connected to a device 10, which controls the switching position of the switching device 9. To this end, the device 10 connects the input of the switching device 9, at which the maximum limiting torque Mmax is present, to the output of the switching device 9 when the vehicle Speed does not undershoot the limiting value x. In this case, Mmax is output by the switching device 9 to the device 11.

The device 10 connects that input of the switching device 9 connected to the device 8 to the output of the switching device 9 when the vehicle speed undershoots a limiting value x. In this case, the output value of the device 8 (MGrenz or MGmin) is output by the switching device 9 to a limiting device 11. To this end, the device 10 typically transmits a control signal to the switching device 9.

The limiting device 11 receives from the processing device 4 the provisional desired torque Mvsoll, which is limited to a final desired torque Msoll in the limiting device 11. In the embodiment illustrated, the device 11 also receives a value for a final permissible torque Mzul from the monitoring unit 2.

From the different torques which it receives (that is, Mvsoll, Mmax and MGrenz or MGmin and Mzul) the limiting device 11 determines a final value of Msoll. To this end, the provisional desired torque Mvsoll is limited to the final desired torque Msoll with the limiting value Mmax and MGrenz or MGmin and the final permissible torque Mzul. The final desired torque Msoll that results is output for conversion by the function computer 1 of the control unit.

The monitoring computer 2 of the control unit receives information relating to the operating state of the motor vehicle and the vehicle drive, via external connections 3*a* to 3*d*. In the embodiment illustrated, this information is passed on to the monitoring computer 2 via the function computer 1.

By way of example, what is involved here is information from a pedal value sensor of an accelerator pedal, and information relating to the setting of a vehicle speed limiter, and a torque stipulation Md of an electronic stability program.

A device 12 of the monitoring computer 2 processes the incoming information and calculates a provisional permissible torque Mvzul from the different incoming torque requirements and, if applicable, from the additional information assigned to them. In addition, it also controls the starting torque, and adapts the driving behavior of the motor vehicle to the pedal value required by the pedal value, sensor of the accelerator pedal.

An assigning device 13 of the monitoring computer 2 assigns a maximum speed Nmax to a provisional permissible torque Mvzul fed to it by the processing device 12. A family of characteristics or a conversion function, for example, is stored to this and in the assigning device 13.

In a device 14, the value for Nmax is compared with a current actual speed Nist. In the embodiment illustrated, the value for the current actual speed Nist is Subtracted from Nmax. This can be the rotational speed of a vehicle wheel or a vehicle drive (for example an internal combustion engine). The device 14 feeds the result of this operation to a device 15, which is typically designed as a comparator. If Nmax·Nist>=0, no signal (or the value 0) is passed on by the device 15 to the device 16. If Nmax·Nist<0, a signal (or the value 1) is passed on by the device 15 to the device 16, which is also connected to the device 17. The latter gives a signal (or a value 1) to the device 16 if the vehicle speed v undershoots the limiting value x. The device 16, which is typically designed as a logic "AND", gives a control signal to a switching device 19 when a signal is present at both of its inputs (both device 17 and device 15 output a value 1).

In the embodiment illustrated, a device 18 is provided between the device 16 and a device 19, and operates to delay the signals. This compensates travel time differences between function level and monitoring level (for example by the reaction time of the speed controller 7) and synchronizes the data flow. Alternatively or in addition, provision is made to send a signal from the device 18 to the device 19 only when the conditions Nist>=Nmax and v<x are met over a defined time interval.

The switching device 19, which has an input at which it receives the maximum moment Mmax of a vehicle wheel or of the vehicle drive, and a further input at which it receives a value for the minimum limiting torque MGmin, is connected to the device 16. If the device 16 does not send a control signal, the input of the switching device 19 is connected to that output of the switching device 19 at which the maximum limiting torque Mmax is present, and passes the maximum limiting torque Mmax on to a device 21.

If the device 16 sends a control signal, the input of the switching device 19 is connected to that output of the switching device 19 at which the minimum limiting torque MGmin is present. In this case, the minimum limiting torque MGmin is passed on by the switching device 19 to a limiting device 21.

In the embodiment illustrated, a device 20 is provided between the switching device 19 and the device 21. The device 20 receives from the switching device 19 a value for the minimum limiting torque MGmin or a value for the maximum limiting torque Mmax. If the newly input value deviates from the old value present go far, the device 20 continuously adapts its output value to the new input value via, a transition function, for example a ramp. The device 20 outputs its output value to a device 21.

The device 21 is, furthermore, fed the provisional permissible torque Mvzul from the device 12. A value for a final permissible torque Mzul is determined by the device 21 from their different torques that are fed (Mmax or MGmin and Mvzul). In this case, Mvzul is limited to Mzul by the maximum torque Mmax when the vehicle speed v does not undershoot the limit value x and/or no excessively high speed Nist (>=Nmax) is present. Since the provisional permissible torque should normally not overshoot the maximum permissible torque, the final permissible torque Mzul mostly corresponds to the provisional permissible torque Mvzul.

If the conditions for an excessively high speed Nist (>=Nmax) are present in the starting range (v<x), the provisional permissible torque Mvzul is bounded above to the final permissible torque Mzul via the, usually very low, minimum limiting torque MGmin. A very low final permissible torque Mzul results in this case.

The value determined for the final permissible torque Mzul is passed on to the function computer 1 for the purpose of limiting Msoll. Furthermore, the monitoring computer 2 outputs the final permissible torque Mzul to other function areas (not illustrated) of the monitoring computer 2 in order to convert a speed dependent torque comparison and, if appropriate, to initiate fault reactions.

A provisional desired torque Mvsoll is determined in the function computer 1 from many different torque requirements, in the device 4. During normal driving operation, this desired torque Mvsoll is limited by a maximum torque Mmax starting from a vehicle speed limit x. In addition, as already set forth, the monitoring computer 2 forms a value for a final permissible torque Mzul as further limitation. Since v<x is not fulfilled, the switching device 19 remains in the illustrated basic position and passes on the torque Mmax. This value Mmax, or the transitional value for Mmax formed in device 20, is correspondingly compared with Mvzul in device 21. The smaller of these two values is output as current value for Mzul.

In the starting range, below a vehicle speed limit x, the switching device 9 switches over and passes on the values output by device 8. As a rule, in this case the limiting torque MGrenz (dependent on the accelerator pedal value) is passed on. The device 8 passes on MGmin only if the value of MGrenz undershoots the value of MGmin. The value Mzul is formed as further limitation in the monitoring computer 2. If the vehicle speed lies below the limiting value x, and if the actual speed Nist does not overshoot the limiting value Nmax, as in normal operation, Mmax, or a transitional value formed in device 20 for Mmax, is compared in device 21 with Mvzul. The smaller of the two values is output as current value for Mzul. In this case, the provisional desired torque Mvsoll can then be bounded above in device 11 to a final desired torque Msoll, as a rule by MGrenz and Mmax. However should MGrenz assume a value smaller than MGmin in the starting range, the function computer 1 limits the provisional desired torque Mvsoll with MGmin. Since MGmin has a very low value, this usually means that a final desired torque Msoll bounded above to MGmin is formed in device 11.

When the monitoring level 2 detects in the starting range that the speed Nist overshoots the maximum speed Nmax, device 16 sends a signal to the switching device 19. The minimum limiting torque MGmin is now passed on to the device 21 by the switching device 19 or a transitional value formed in the device 20. Consequently, the final permissible torque Mzul is bounded above at MGmin in the limiting device 21. This torque Mzul is passed on to the device 11 of the function computer 1. The provisional desired torque Mvsoll is now also limited there to the value of MGmin by Mzul, and this value is output as desired torque Msoll to be controlled.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A control unit for operating a vehicle drive in a vehicle having an accelerator pedal value sensor and a further measured value or manipulated value sensor, said control unit comprising:

a function computer, and a processing device and a first limiting device in said function computer; wherein, the function computer is connected via a data link to receive variable data from said accelerator pedal value sensor and said further measured value or manipulated variable sensor; and said processing device determines a provisional desired torque based on said variable data received from the measured value sensor or manipulated variable sensor;

said first limiting device limits the provisional desired torque;

the provisional desired torque is bounded above with a maximum limiting torque to a final desired torque when a detected vehicle speed is greater than or equal to a starting limiting speed; and the provisional desired torque is bounded above to the final desired torque with a limiting torque dependent on the measured/manipulated variables of the accelerator pedal value sensor when the detected vehicle speed lies below the starting limiting speed.

2. The control unit as claimed in claim 1, wherein said function computer further comprises a second limiting device which bounds the limiting torque below, with a definable minimum limiting torque.

3. The control unit as claimed in claim 2, wherein in the first limiting device the final desired torque is bounded above with a variable limiting value formed in a monitoring computer.

4. The control unit as claimed in claim 3. further comprising an assigning device and a speed controller; wherein, the assigning device is operable to assign a maximum speed to the provisional desired torque; and the speed controller is operable to lower the detected speed when a detected speed is greater than the maximum speed.

5. The control unit as claimed in claim 4 wherein:

the measured/manipulated variables input into the function computer are also input into a monitoring computer assigned to the function computer; and the monitoring computer is operable to form provisional permissible torque from the input measured/manipulated variables.

6. The control unit as claimed in claim 5, wherein the monitoring computer has a limiting device which is operable to form an upper bound for the provisional permissible torque, to a final permissible torque with the maximum limiting torque when at least one of the following is true:

the detected drive speed is smaller than or equal to a maximum speed assigned to it; and the vehicle speed is greater than or equal to a limiting value assigned to it.

7. The control unit as claimed in claim 5, wherein the monitoring computer has a limiting device which is operable to implement an upper bound the provisional permissible torque, to a final permissible torque with a minimum permissible limiting torque when the detected drive speed is greater than the maximum speed assigned to it, and the vehicle speed undershoots a limiting value assigned to it.

8. The control unit as claimed in claim 7, wherein:

the monitoring computer is incapable of detecting the conditions that (i) the speed of the vehicle drive is greater than or equal to the maximum speed, or (ii) that the speed of the vehicle overshoots the limiting value assigned to it, until both of said conditions are present jointly over a variably definable period.

9. The control unit as claimed in claim 8, wherein a fault signal is generated and output by the monitoring computer when the latter monitoring computer detects that the detected speed of the vehicle drive is greater than a maximum speed.

10. The control unit as claimed in claim 7, wherein a device of the monitoring computer is operable to form a transition function for a continuous transition from a previously present limiting value to a newly fed limiting value; and the transition function can be fed to the limiting device.

* * * * *